US011333173B2

(12) United States Patent
Nichols et al.

(10) Patent No.: US 11,333,173 B2
(45) Date of Patent: May 17, 2022

(54) INTER-COMPRESSOR CROSS-OVER PIPE HEAT EXCHANGER

(71) Applicant: PRATT & WHITNEY CANADA CORP., Longueuil (CA)

(72) Inventors: Jason Nichols, Mississauga (CA); Yves Cloutier, St-Bruno-de-Montarville (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 92 days.

(21) Appl. No.: 16/406,659

(22) Filed: May 8, 2019

(65) Prior Publication Data
US 2020/0340402 A1 Oct. 29, 2020

Related U.S. Application Data

(60) Provisional application No. 62/839,160, filed on Apr. 26, 2019.

(51) Int. Cl.
*F04D 29/58* (2006.01)
*F01D 9/06* (2006.01)
*F04D 17/12* (2006.01)

(52) U.S. Cl.
CPC .......... *F04D 29/5826* (2013.01); *F01D 9/06* (2013.01); *F04D 17/122* (2013.01); *F05D 2240/12* (2013.01); *F05D 2250/75* (2013.01); *F05D 2260/22141* (2013.01)

(58) Field of Classification Search
None
See application file for complete search history.

(56) References Cited

U.S. PATENT DOCUMENTS

| 4,196,593 A | * | 4/1980 | Froeliger | F02B 37/013 60/612 |
| 5,269,133 A | * | 12/1993 | Wallace | F02C 7/185 60/204 |
| 6,092,361 A | * | 7/2000 | Romani | F28D 7/005 60/39.511 |
| 6,134,880 A | * | 10/2000 | Yoshinaka | F28D 7/00 60/226.1 |
| 6,430,931 B1 | * | 8/2002 | Horner | F04D 29/5826 60/785 |
| 8,281,564 B2 | | 10/2012 | Zhang et al. | |
| 9,752,585 B2 | * | 9/2017 | Kupratis | F02K 3/075 |

(Continued)

FOREIGN PATENT DOCUMENTS

EP 0043554 1/1982

OTHER PUBLICATIONS

European Search Report dated Aug. 18, 2020 for Application No. 20171663.6.

*Primary Examiner* — Juan G Flores
*Assistant Examiner* — Jason Fountain
(74) *Attorney, Agent, or Firm* — Norton Rose Fulbright Canada LLP

(57) ABSTRACT

The gas turbine engine described includes a first centrifugal compressor, a second centrifugal compressor, and intercompressor pipes extending therebetween. The intercompressor pipes fluidly interconnect an exit of a first impeller of the first centrifugal compressor and an inlet of a second impeller of the second centrifugal compressor. The intercompressor pipes have heat transfer structures on outer surfaces thereof to increase convective heat transfer.

20 Claims, 5 Drawing Sheets

(56) References Cited

U.S. PATENT DOCUMENTS

| | | | |
|---|---|---|---|
| 2014/0271121 A1* | 9/2014 | Kupratis | F02C 3/08 |
| | | | 415/1 |
| 2015/0053377 A1* | 2/2015 | Hara | B23P 15/26 |
| | | | 165/148 |
| 2018/0094583 A1 | 4/2018 | Carretero Benignos et al. | |
| 2018/0298758 A1 | 10/2018 | Cunningham | |

* cited by examiner

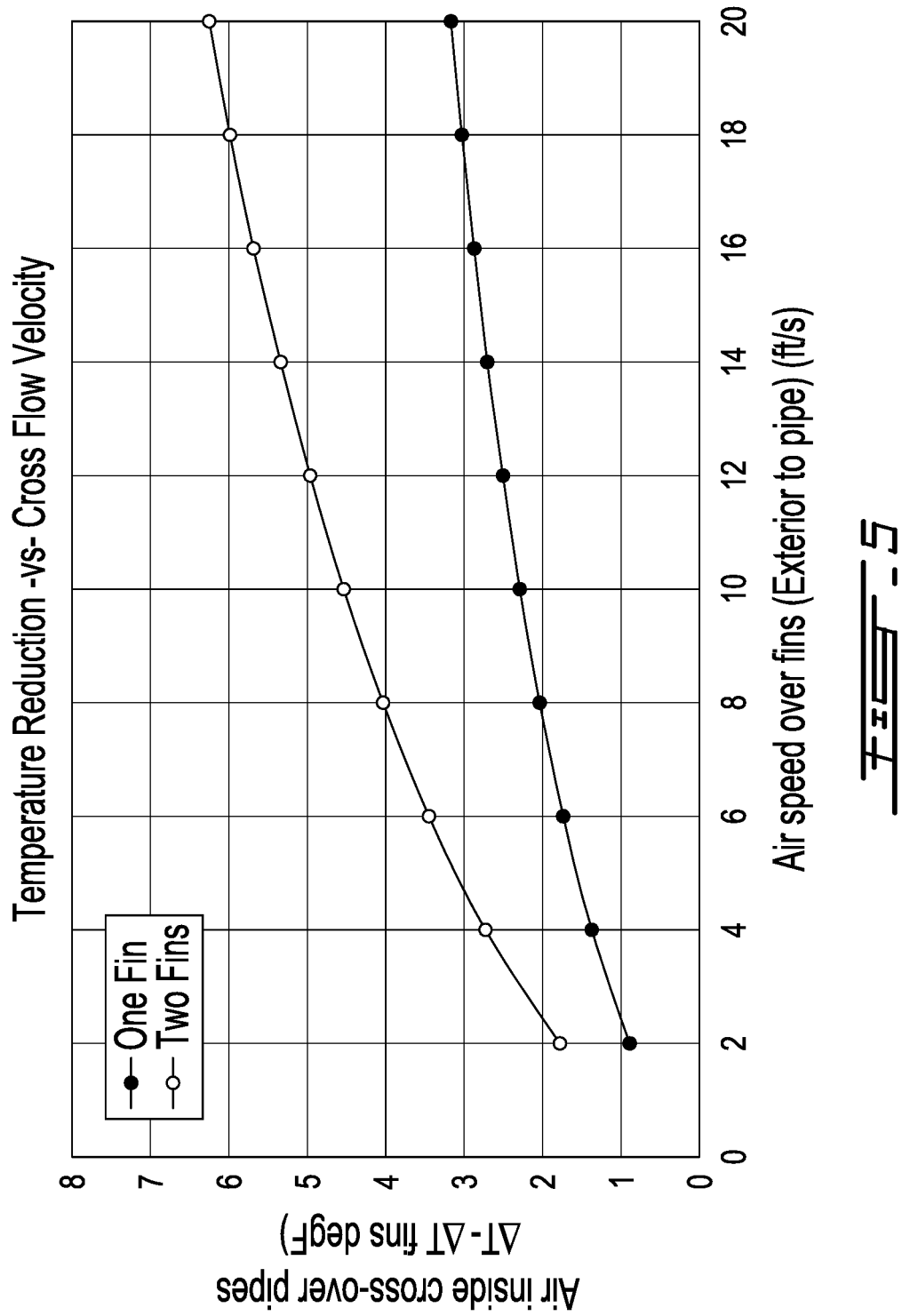

INTER-COMPRESSOR CROSS-OVER PIPE HEAT EXCHANGER

CROSS-REFERENCE TO RELATED APPLICATIONS

The present application claims priority on U.S. Provisional Patent Application No. 62/839,160 filed Apr. 26, 2019, the entire contents of which are incorporated herein by reference.

TECHNICAL FIELD

The disclosure relates generally to gas turbine engines, and more particularly to centrifugal compressors of gas turbine engines.

BACKGROUND

Most gas turbine engines have multiple axial compressors. The use of multiple centrifugal compressors in a gas turbine engine is however less common. In such a gas turbine engine, multiple centrifugal compressor stages may be provided adjacent to each other in serial flow arrangement. Inter-compressor "cross-over" pipes are used to direct the compressed air flow from the upstream centrifugal compressor to the downstream centrifugal compressor.

Improvement of such intercompressor cross-over pipes is sought.

SUMMARY

There is accordingly provided a gas turbine engine comprising: a first centrifugal compressor and a second centrifugal compressor, respectively including first and second impellers; a plurality of intercompressor pipes fluidly connecting an exit of the first impeller and an inlet of the second impeller, the intercompressor pipes having heat transfer structures thereon, the heat transfer structures including one or more projection extending radially from an outer surface of the intercompressor pipes.

There is also provided a centrifugal compressor for a gas turbine engine comprising: an impeller having an inner hub with a plurality of vanes extending therefrom, the impeller being rotatable within an outer shroud about a central longitudinal axis, the impeller having an axial impeller inlet and a radial impeller outlet; and a diffuser configured to diffuser air received from the impeller outlet, the diffuser including one or more diffuser pipes having a tubular body defining an internal flow passage extending therethrough between an inlet and an outlet of the diffuser pipes, the inlet of the diffuser pipes in fluid flow communication with the radial outlet of the impeller, the tubular body including a first portion defining the inlet and extending in a first direction, a second portion terminating at the outlet and extending in a second direction different from the first direction, and a curved portion fluidly liking the first portion and the second portion, the curved portion of the diffuser pipes having a heat transfer structure on outer surfaces thereof, the heat transfer structure include one or more radial projection extending from the outer surface of the diffuser pipes.

There is further provided a method of reducing temperature of compressed air within a gaspath of a multi-stage compressor of a gas turbine engine, the method comprising: directing air through internal passages of intercompressor pipes extending between a radial exit of a first impeller of a first centrifugal compressor and an axial inlet of a second impeller of a second circumferential impeller; and using a heat transfer structure projecting at least partially radially away from an outer surface of one or more of the intercompressor pipes to transfer heat away from the air flowing through the internal passages of the intercompressor pipes and outward to an environment outside the intercompressor pipes.

Embodiments can include combinations of the above features. Further details of these and other aspects of the subject matter of this application will be apparent from the detailed description included below and the drawings.

BRIEF DESCRIPTION OF THE DRAWINGS

Reference is now made to the accompanying drawings.

FIG. 5 is a graph showing temperature reduction of air flowing within the intercompressor pipes of FIGS. 2-3.

DETAILED DESCRIPTION

Figure 1:
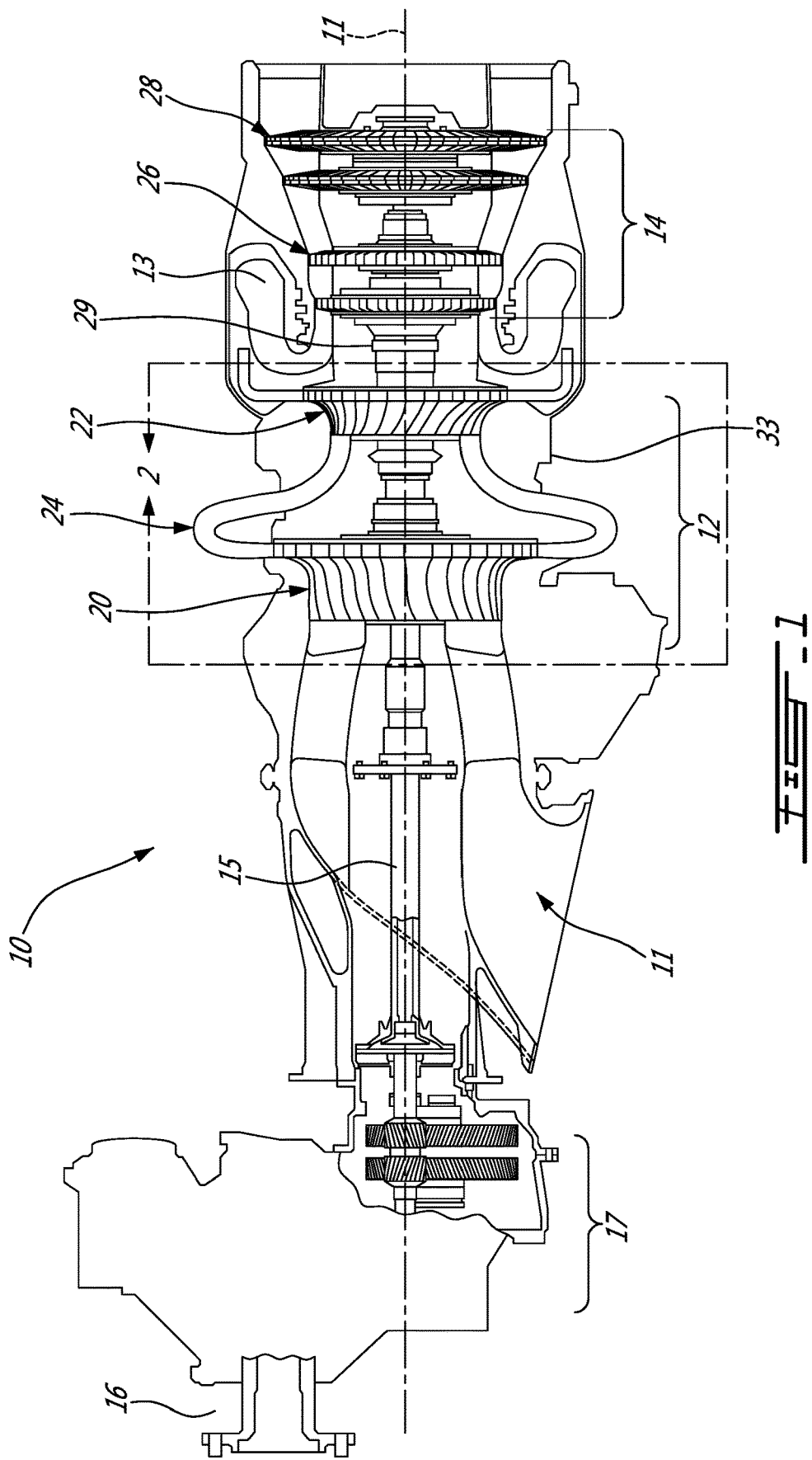
FIG. 1 is an axial cross-section view of a gas turbine engine, having low pressure and high pressure centrifugal compressors.

FIG. 1 illustrates a gas turbine engine 10 of a type preferably provided for use in subsonic flight, generally comprising in serial flow communication an air intake 11 through which air is drawn, a compressor section 12 within which the air is compressed, a combustor 13 in which the compressed air is mixed with fuel and ignited for generating an annular stream of hot combustion gases, and a turbine section 14 for extracting energy from the combustion gases.

The gas turbine engine 10 of FIG. 1 is a turboprop engine, and therefore includes a power output shaft 15 connected to and driven by one or more of the turbines from the turbine section 14 to transmit a driving force to a propeller of the aircraft via a reduction gearbox 17 driving a propeller output flange 16. While an airborne turboprop engine 10 is shown in FIG. 1, it is to be understood that the present disclose equally applies to other types of gas turbine engines, including for example turboshaft engines and non-airborne applications.

In the embodiment of FIG. 1, the turbine section 14 of the gas turbine engine 10 includes two sets of turbines, namely compressor turbine(s) 26 and power turbine(s) 28. The compressor turbine(s) 26 drive the compressor rotors of the compressor section 12, and are therefore mounted to a common core engine shaft 29. The power turbine(s) 28 are mounted to the power output shaft 15, which is coaxial and concentric with the core engine shaft 29, which drives the reduction gearbox 17 and ultimately the output propeller flange 16.

Figure 2:
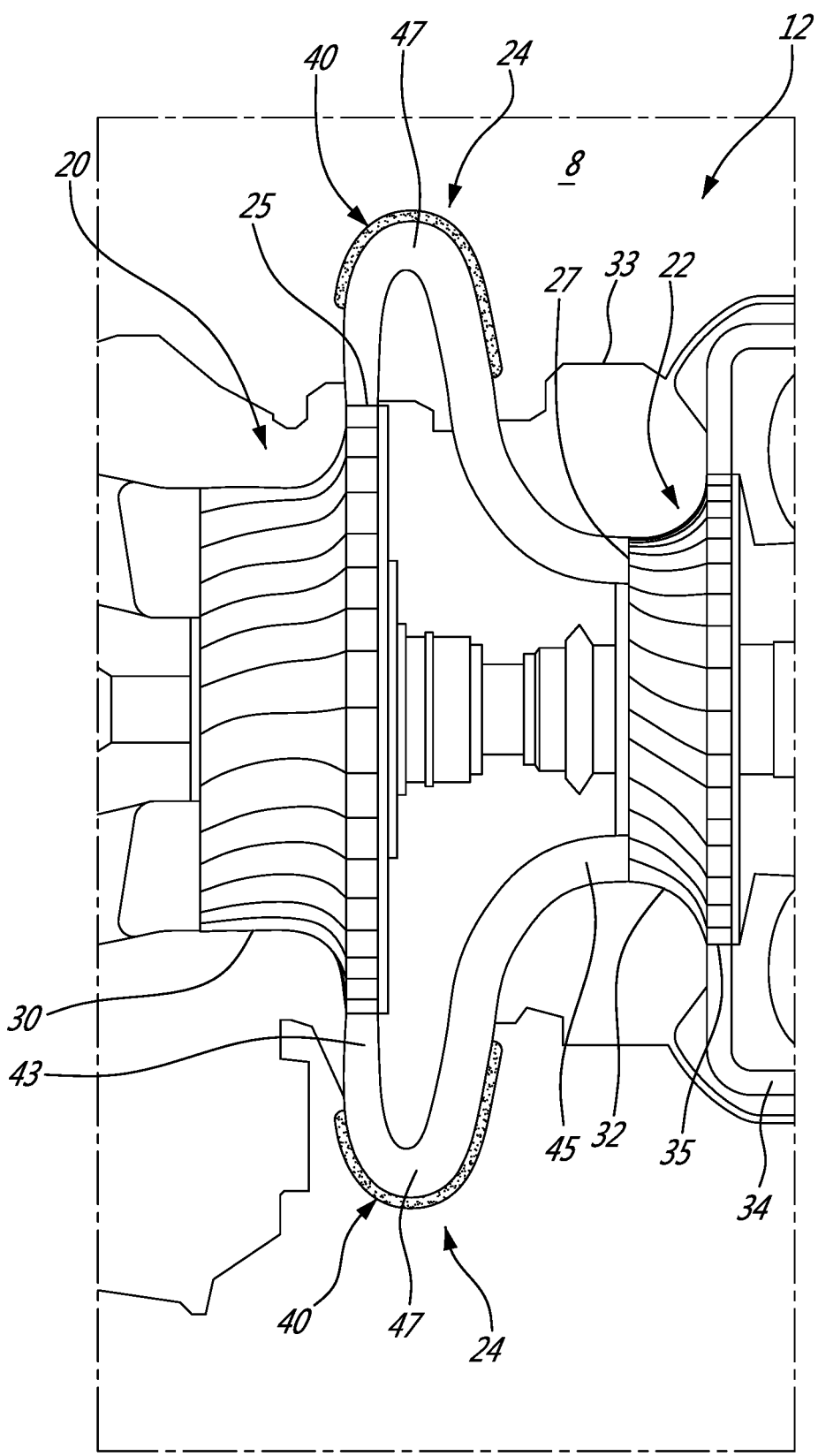
FIG. 2 is a detailed axial cross-section view, taken from region 2 in FIG. 1, showing the low pressure centrifugal compressor, the high pressure centrifugal compressor, and intercompressor pipes of the compressor section of the gas turbine engine of FIG. 1.

As can be appreciated from FIGS. 1 and 2, the compressor section 12 of the gas turbine engine 10 is a multi-stage compressor and includes two centrifugal compressors, namely a first, upstream, centrifugal compressor 20 and a second, downstream, centrifugal compressor 22. The upstream centrifugal compressor 20 will be referred to herein as the low pressure (LP) centrifugal compressor 20, and the downstream centrifugal compressor 22 will be referred to herein as the high pressure (HP) centrifugal compressor 22. These two centrifugal compressors 20 and 22 are disposed adjacent to one another and in succession within the flow path of the compressor section 12, such that they are in serial flow communication without any intervening compressor stages (e.g. axial compressors) therebetween.

Each of the centrifugal compressors 20, 22 includes an impeller and a diffuser downstream therefrom. Although vane diffusers may also be used, in the depicted embodiment both of the centrifugal compressors 20 and 22 employ diffuser pipes downstream from their respective impellers. More particularly, the LP centrifugal compressor 20 includes an LP impeller 30 and LP diffuser pipes 24 (which, as will be seen, are also referred to herein as intercompressor cross-over pipes, or simply "intercompressor pipes", 24, given that they interconnect the two centrifugal compressors 20, 22) which receive the compressed air exiting the LP impeller 30 at LP exit 25. The HP centrifugal compressor 22 includes an HP impeller 32 and HP diffuser pipes 34 which receive the compressed air exiting the HP impeller at HP exit 35 and direct it to the combustor 13 downstream.

With reference to FIG. 2, the diffuser, or intercompressor, pipes 24 have a generally tubular body defining a flow passage extending therethrough, between respective inlets 25 and outlets 27 of the pipe. The tubular body of each diffuser pipe 24 includes generally a first portion 43 extending in a first direction, a second portion 45 extending in a second direction different from the first direction, and a curved portion 47 therebetween that fluidly links the first portion 43 and the second portion 45. As can be seen, in this embodiment, the first portion 43 at the upstream end of the pipe 24 extends substantially radially, the second portion 45 at the downstream end of the pipe extends substantially axially, and the curved portion 47 therebetween includes a U-shaped bend in the pipe between the respective ends. As can also be appreciated from FIGS. 1 and 2, at least a portion of each of the intercompressor pipes 24, and more particularly the U-shaped bend of the curved portion 47 thereof, extends outside of the intercompressor case 33 surrounding LP and HP centrifugal compressors 20 and 22. As such, at least this U-shaped section of the curved portion 47 of the pipes 24 may be referred to herein as a "exposed" section or portion, in that these exposed portions 47 of the intercompressor pipes 24 are exposed to the ambient air conditions surrounding the external intercompressor case 33 of the engine 10.

Each of the LP and HP impellers 30 and 32 generally have an inner hub with a plurality of vanes extending therefrom, the impeller being rotatable within an outer shroud about the central longitudinal axis 11 of the engine, or rotation axis of the impeller. As noted below, each of the impellers 30 and 32 also have an axial inlet and a radial exit, such that air enters each of the impellers 30, 32 in a generally axial direction and air exits each of the impellers in a generally (outwardly) radial direction.

As seen in FIG. 2, the LP diffuser pipes/inter-compressor cross-over pipes 24 (simply "intercompressor pipes" 24, hereinbelow) fluidly interconnect the LP centrifugal compressor 20 and the HP centrifugal compressor 22. Although only two such intercompressor pipes 24 are visible in FIGS. 1 and 2, it is to be understood that a circumferential array of the intercompressor pipes 24 are disposed about the engine, in order to direct the air from the LP centrifugal compressor 20 to the HP centrifugal compressor 22 immediately downstream therefrom. The intercompressor pipes 24 are therefore circumferentially spaced apart about the full perimeter of the compressor section, and all of the intercompressor pipes 24 may, in at least one particular embodiment, be substantially identical to each other in terms of size, length, cross-sectional profile, etc. The intercompressor pipes 24 also diffuse the compressed air from the LP centrifugal compressor 20, and a cross-sectional area of the passages defined within each of the intercompressor pipes 24 increases from the pipe inlet 25 to the pipe exit 27. The intercompressor pipes 24 accordingly direct the LP compressed air flow from a respective pipe inlet 25 (which is also the exit of the LP impeller 30) to a pipe exit 27 (which is also the inlet of the HP impeller 32). The HP impeller 32 of the HP centrifugal compressor 22 accordingly receives compressed air directly from the LP impeller 30 of the LP centrifugal compressor 20 via the intercompressor pipes 24. More particularly, both the LP and HP impellers 30 and 32 generally receive incoming air axially and generally discharge output air radially, with reference to the longitudinally extending centerline axis 11 of the engine 10. The intercompressor pipes 24 according fluidly interconnect a radial outlet 25 of the LP impeller 30 of the LP centrifugal compressor 20 with an axial inlet 27 of the HP impeller 32 of the HP centrifugal compressor 22 located downstream therefrom.

Figure 3:
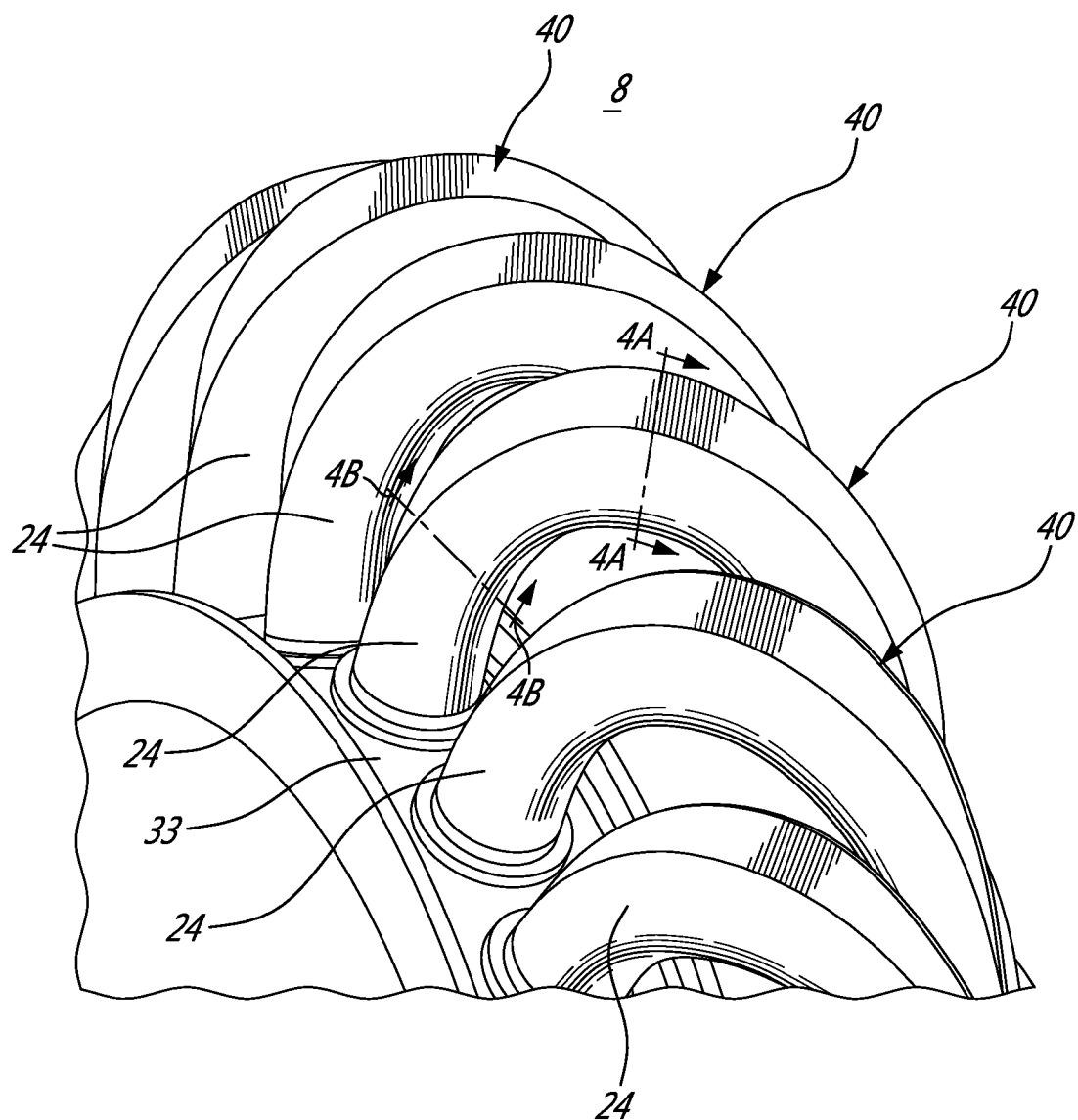
FIG. 3 is a partial perspective exterior view of the intercompressor pipes of the compressor section of FIGS. 1 and 2.

Referring now to FIGS. 2 and 3, air which is compressed by the LP impeller 30 of the LP centrifugal compressor 20 becomes heated during its compression, and therefore the compressed air exiting the first compression stage (i.e. the air exiting the LP impeller 30 at 25) has a significant temperature rise relative to ambient surroundings, including the region 8 outside the intercompressor case 33 of the engine 10, which may be within an engine nacelle or other enclosure of the aircraft. As such, the compressed air flowing through the intercompressor pipes 24, which diffuses the compressed air from the LP impeller 30 and redirects it into the inlet of the HP impeller 32 at 27, is relatively hot in comparison with the ambient air. Typically, in dual-impeller engine designs, this hot compressed air from the first compression stage is simply fed directly into the HP centrifugal compressor 22 of the second compression stage, during which the temperature of the compressed air rises even further. However, reducing the temperature of the air entering the second, HP, compression stage would be desirable as this may help to improve aerodynamic performance and/or operating ranges/conditions of the compressor section 12 and thus the engine 10.

In order cool the compressed air exiting the upstream impeller 30 of the LP centrifugal compressor 20, prior to this air being ingested into the downstream impeller 32 of the HP centrifugal compressor 22, the inter-compressor pipes 24 of the gas turbine engine 10 are accordingly provided with heat transfer surface structures/features 40 thereon, as will now be described in further detail. The terms heat transfer structures and heat transfer features may both be used herein, and refer to the same thing, namely elements 40 which are provided on the intercompressor pipes which are configured and operable to increase the heat transfer away from the intercompressor pipes 24 (in comparison with similar intercompressor pipes not having any additional heat transfer augmenting structures thereon). As such, the inter-compressor pipes 24 as described herein act as heat exchangers, whereby heat within the air flowing through the interior of the pipes 24 is transferred, via conduction through the walls of the pipes and the heat transfer structures 40 thereon and then via convection out from the heat transfer structures 40 into the environment surrounding the compressor section 12 of the gas turbine engine 10.

The heat transfer structures 40 as described herein may have a variety of shapes, however may in at least certain embodiments include one or more fins, which one skilled in the art of heat transfer will understand are surfaces that extend from an object to increase the rate of heat transfer to or from the environment by increasing convection. This may be achieved, for example, by increasing the surface area of the pipes 24 having the structures 40. It is to be understood, however, that a heat transfer structure 40 as described herein is not mere surface roughness or other non-substantive projection, but structures which visibly project outwardly from the outer surfaces of the intercompressor pipes 24 a non-negligible amount (in terms of its ability to increase heat transfer). For example, mere surface roughness of an otherwise fin-free pipe would not constitute a heat transfer structure 40 as described herein.

Referring now to FIG. 3, each of the intercompressor pipes 24 of the compressor section 12 of the engine 10 has at least one heat transfer structure 40 thereon which increases the convective heat transfer away from the intercompressor pipes 24. The heat transfer features 40 comprise one or more projections which project or extend radially outwardly from a circumferential outer surface of the intercompressor pipes 24. In one particular embodiment, the heat transfer features 40 may include a single radially extending fin on the intercompressor pipe 24. In other embodiments, the heat transfer structures 40 include a plurality (e.g. an array) of fins or pins on the intercompressor pipes 24. While it is to be understood that not all of the heat transfer structures 40 may project radially, in one embodiment at least one heat transfer structure 40 extends from the outer surface of the pipes in a substantially radial direction.

In the depicted embodiment, the heat transfer surface features 40 comprise fins that project from and extend along a portion of the pipe 24, and may be disposed entirely within the aforementioned exposed portions of the pipes 24 which extend beyond the intercompressor case 33. The heat transfer structures may be disposed on a radially outer side of the U-shaped portion of the bend in the intercompressor pipes, as seen in FIGS. 2 and 3. In at least this embodiment, each of the fins 40 extends over a major portion (i.e. greater than 50%) of an exposed length of the intercompressor pipes 24 within the region 8 outside the intercompressor case 33. Although in the embodiment of FIG. 3 these fins 40 are substantially uninterrupted along their lengths, a plurality of spaced apart fins 40 may also be provided. As seen in the embodiment of FIG. 3, with reference also to FIGS. 4A and 4B, each of the fins 40 forming the heat transfer surface features may have a Mohawk-like shape, wherein a central portion of the fin 40 (which may be proximate to a midpoint of the curve of the bend in the pipe 24—i.e. a midpoint of the curved portion) has a greater height away from the outer surface of the intercompressor pipe 24 than do the outer ends of the fin 40. In one particular embodiment, the heat transfer structures 40 are located on a majority (i.e. more than 50%) of the pipes 24 that form a circumferential array of the diffuser/intercompressor pipes 24.

In the embodiment of FIG. 3, the fins 40 forming the heat transfer surface features are circumferentially on each of the intercompressor pipes 24 at substantially the same location (e.g. circumferentially about the pipe) and are similarly sized and shaped, such that the array of intercompressor pipes 24 define a similar and corresponding array of heat transfer surface features 24 thereon. However, the fins or other structures forming the heat transfer surface features 40 may be disposed at one or more locations about the circumference of each of the pipes 24. For example, each of the pipes 24 may have a plurality of fins 40 therein, circumferentially spaced apart about the perimeter of each of the pipes 24.

Figure 4A:
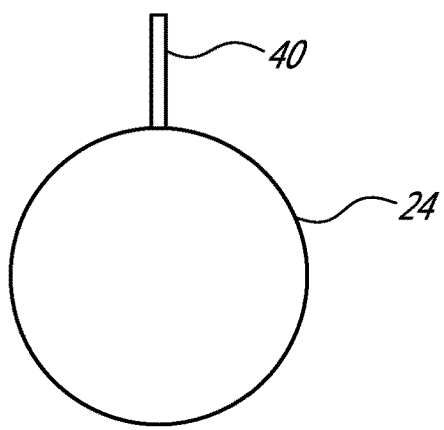
FIGS. 4A and 4B are schematic cross-sectional views of the intercompressor pipes of FIGS. 2 and 3, taken through lines 4A-4A and 4B-4B, respectively, in FIG. 3.
Figure 4B:
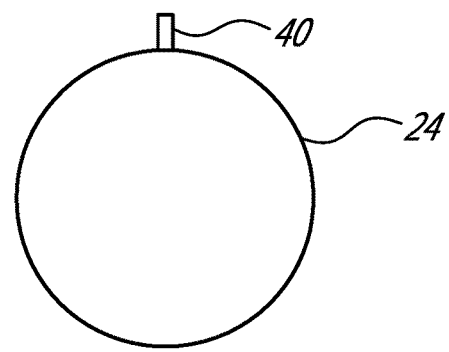
Figure 4C:
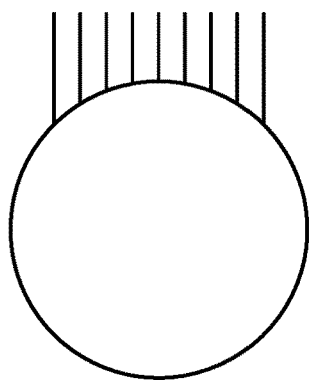
FIGS. 4C to 4F are schematic cross-sectional views of alternate intercompressor pipes for use in the compressor and engine of FIGS. 2 and 3.
Figure 4D:
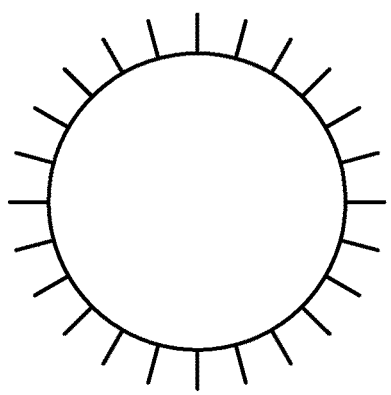
Figure 4E:
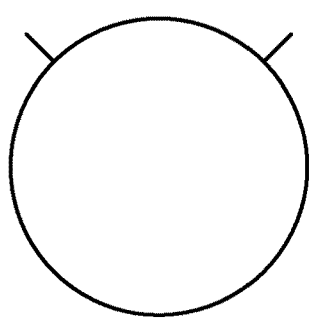
Figure 4F:
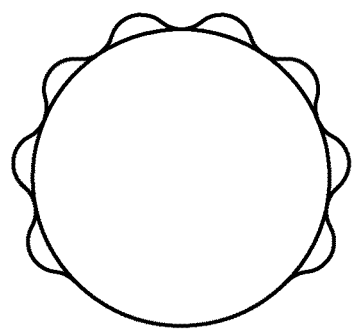

Although a single longitudinally extending heat-transfer fin 40 is shown FIGS. 3, 4A and 4B, other heat transfer structures could alternately be used, such as transversely extending fins, a plurality of pins, etc. Accordingly, although in the embodiment of FIG. 3 the heat transfer surface features 40 are fins, alternate structures are similarly possible, including but not limited to, pins, dimples, ridges, grooves, etc., as shown in FIGS. 4C-4F. Each pipe 24 may therefore have only one or a plurality of such heat transfer surface features 40 thereon, and in any number of suitable patterns, shapes, configurations and sizes, as will be appreciated by one skilled in the art.

In all cases, however, the additional surfaces and surface area provided by the heat transfer surface features 40 will help to increase the convective heat transfer away from the intercompressor pipes 24, such that the heat within the compressed air flowing within the intercompressor pipes 24 will be at least partially drawn away from the air and expelled into the surrounding environment 8. As a result, the temperature of the air at the exit 27 of the intercompressor pipes 24 will be lower than it would be at the exist of a similar intercompressor pipe 24 that does not have any such heat transfer surface features 40 thereon. In other words, the convective heat transfer between the intercompressor pipes 24 and their surroundings will be increased in comparison with similar pipes without such features 40. This may significantly reduce the temperature of the air flow entering the second compression stage of the engine, more particularly the HP impeller 32 of the HP centrifugal compressor 22. The heat drawn away from the heat transfer surface features 40 on the intercompressor pipes 24 on the crossover pipes is convected away to the air outside the gaspath, and indeed in certain embodiments to outside the engine 10 and thus into the surrounding nacelle which is vented to atmosphere.

Referring now to FIG. 5, the graph illustrates the effect on the temperature of the compressed air flowing within the intercompressor pipes 24 having the two different embodiments of heat transfer surface features 40 thereon, namely wherein each pipe has one fin and wherein each pipe has two fins. In both cases, the temperature difference ($\Delta T$) is compared to a similarly pipe without any such fins/features 40. As can be seen in FIG. 5, for example, at an air speed of 8 ft/s over exterior of the intercompressor pipes, an intercompressor pipe having one heat transfer fin may provide about 2 degrees F. reduction in air temperature inside the pipe (in comparison with a similar pipe without any such fins), whereas the same intercompressor pipe having two heat transfer fins may provide about 4 degrees F. reduction in air temperature inside the pipe (in comparison with a similar pipe without any such fins). As can also be seen in FIG. 5, the greater the number of heat transfer fins, the greater the temperature reduction of the air inside the pipe, particularly as the speed of the air flowing over the exterior of the pipes increases.

As per the embodiments described above, therefore, the present disclosure therefore provides heat exchange surface features on inter-compressor crossover pipes of a gas turbine engine, for the purposes of increasing the heat transfer away from the pipes and thus reducing the temperature of the compressed air between the LP and the HP impellers, in a dual centrifugal compressor engine configuration. The is therefore provided inter-compressor crossover pipes, extending between two centrifugal compressors in a multi-stage compressor section of a gas turbine engine, wherein the inter-compressor cross-over pipes have one or more heat exchange surface features added thereto.

The above description is meant to be exemplary only, and one skilled in the relevant arts will recognize that changes may be made to the embodiments described without departing from the scope of the invention disclosed. The present disclosure may be embodied in other specific forms without departing from the subject matter of the claims. The present disclosure is intended to cover and embrace all suitable changes in technology. Modifications which fall within the scope of the present invention will be apparent to those skilled in the art, in light of a review of this disclosure, and such modifications are intended to fall within the appended claims. Also, the scope of the claims should not be limited by the preferred embodiments set forth in the examples, but should be given the broadest interpretation consistent with the description as a whole.

What is claimed is:

1. A gas turbine engine comprising:
a first centrifugal compressor and a second centrifugal compressor in serial flow communication, respectively including first and second impellers, the first impeller being a low pressure impeller and the second impeller being a high pressure impeller;
a first turbine rotatably connected to the high pressure impeller and a second turbine rotatably connected to the low pressure impeller, the low pressure impeller and the high pressure impeller being independently rotatable relative to each other;
a plurality of intercompressor pipes fluidly connecting an exit of the low pressure impeller and an inlet of the high pressure impeller to direct all compressed air exiting the low pressure impeller into the inlet of the high pressure impeller, the intercompressor pipes having heat transfer structures thereon, the heat transfer structures including one or more projection extending radially from an outer surface of the intercompressor pipes.

2. The gas turbine engine of claim 1, wherein the intercompressor pipes have a tubular body including a first portion extending in a first direction, a second portion extending in a second direction different from the first direction, and a curved portion fluidly linking the first portion and the second portion, the curved portion of the intercompressor pipes having the heat transfer structures thereon.

3. The gas turbine engine of claim 2, wherein an exposed section of the curved portion of the intercompressor pipes extends outside of an intercompressor case at least partially surrounding the first and second centrifugal compressors.

4. The gas turbine engine of claim 3, wherein the heat transfer structures are disposed entirely within said exposed section of the intercompressor pipes outside of the intercompressor case.

5. The gas turbine engine of claim 4, wherein the heat transfer structures are disposed over a major portion of a length of the intercompressor pipes within said exposed section.

6. The gas turbine engine of claim 5, wherein the heat transfer structures are fins that extend longitudinally along said major portion of the length of the exposed section.

7. The gas turbine engine of claim 2, wherein the curved portion of the intercompressor pipes includes a U-shaped bend.

8. The gas turbine engine of claim 7, wherein the heat transfer structures are disposed on a radially outer side of the U-shaped bend in the curved portion of the intercompressor pipes.

9. The gas turbine engine of claim 2, wherein the heat transfer structures define a height extending away from the outer surface of the intercompressor pipes, the height of the heat transfer structures being non-constant along their length.

10. The gas turbine engine of claim 9, wherein the height of heat transfer structures is greater at a longitudinal center than at longitudinal outer ends thereof.

11. The gas turbine engine of claim 10, wherein a maximum height of the heat transfer structures occurs at a point corresponding to a midpoint of the curved portion of the intercompressor pipes.

12. A multi-stage compressor for a gas turbine engine having a gas path, the multi-stage compressor including a first centrifugal compressor and a second centrifugal compressor in serial flow communication, comprising:
an impeller of the first centrifugal compressor having an inner hub with a plurality of vanes extending therefrom, the impeller being rotatable within an outer shroud about a central longitudinal axis, the impeller having an axial impeller inlet and a radial impeller outlet both configured to be in fluid flow communication with the gas path; and
a diffuser of the first centrifugal compressor configured to diffuser air received from the radial impeller outlet, the diffuser including one or more diffuser pipes having a tubular body defining an internal flow passage extending therethrough between an inlet and an outlet of the diffuser pipes, the inlet of the diffuser pipes in fluid flow communication with the radial outlet of the impeller, the outlet of the diffuser pipes in fluid flow communication with an inlet of a second impeller of the second centrifugal compressor located downstream of the first centrifugal compressor, the tubular body including a first portion defining the inlet and extending in a first direction, a second portion terminating at the outlet and extending in a second direction different from the first direction, and a curved portion fluidly linking the first portion and the second portion, the gas path extending inside the one or more diffuser pipes, the curved portion located outside the gas path, the curved portion of the diffuser pipes having a heat transfer structure on outer surfaces thereof, the heat transfer structure include one or more radial projection extending from the outer surface of the diffuser pipes.

13. The multi-stage compressor of claim 12, wherein the diffuser pipes form a circumferential array, each diffuser pipe of the circumferential array extending between the radial impeller outlet and the outlet of the diffuser pipes, and wherein the heat transfer structures are located on a majority of the diffuser pipes of the circumferential array.

14. The multi-stage compressor of claim 12, wherein the heat transfer structures include a plurality of fins and/or pins.

15. The multi-stage compressor of claim 12, wherein each of the diffuser pipes includes one or more heat transfer fins extending therealong.

16. The multi-stage compressor of claim 15, wherein the one or more heat transfer fins extend longitudinally along each of the diffuser pipes.

17. The multi-stage compressor of claim 12, wherein the heat transfer structures on all of the diffuser pipes are the same.

18. The multi-stage compressor of claim 12, wherein an exposed section of the curved portion of the diffuser pipes extends outside of an intercompressor case at least partially surrounding the multi-stage compressor, the heat transfer structures disposed entirely within said exposed section of the diffuser pipes outside of the intercompressor case.

19. The multi-stage compressor of claim 18, wherein the heat transfer structures are disposed on a radially outer side of the curved portion of the diffuser pipes.

20. A method of reducing temperature of compressed air within a gaspath of a multi-stage compressor of a gas turbine engine including a first centrifugal compressor and a second centrifugal compressor, the method comprising:
- directing all compressed air exiting a radial exit of a first impeller of the first centrifugal compressor into inlets of intercompressor pipes extending between the first and second centrifugal compressors, the compressed air exiting from outlets of the intercompressor pipes flowing into an axial inlet of a second impeller of the second centrifugal compressor; and
- using a heat transfer structure projecting at least partially radially away from an outer surface of one or more of the intercompressor pipes to transfer heat away from the air flowing through the internal passages of the intercompressor pipes and outward to an environment outside the intercompressor pipes.

* * * * *